UNITED STATES PATENT OFFICE.

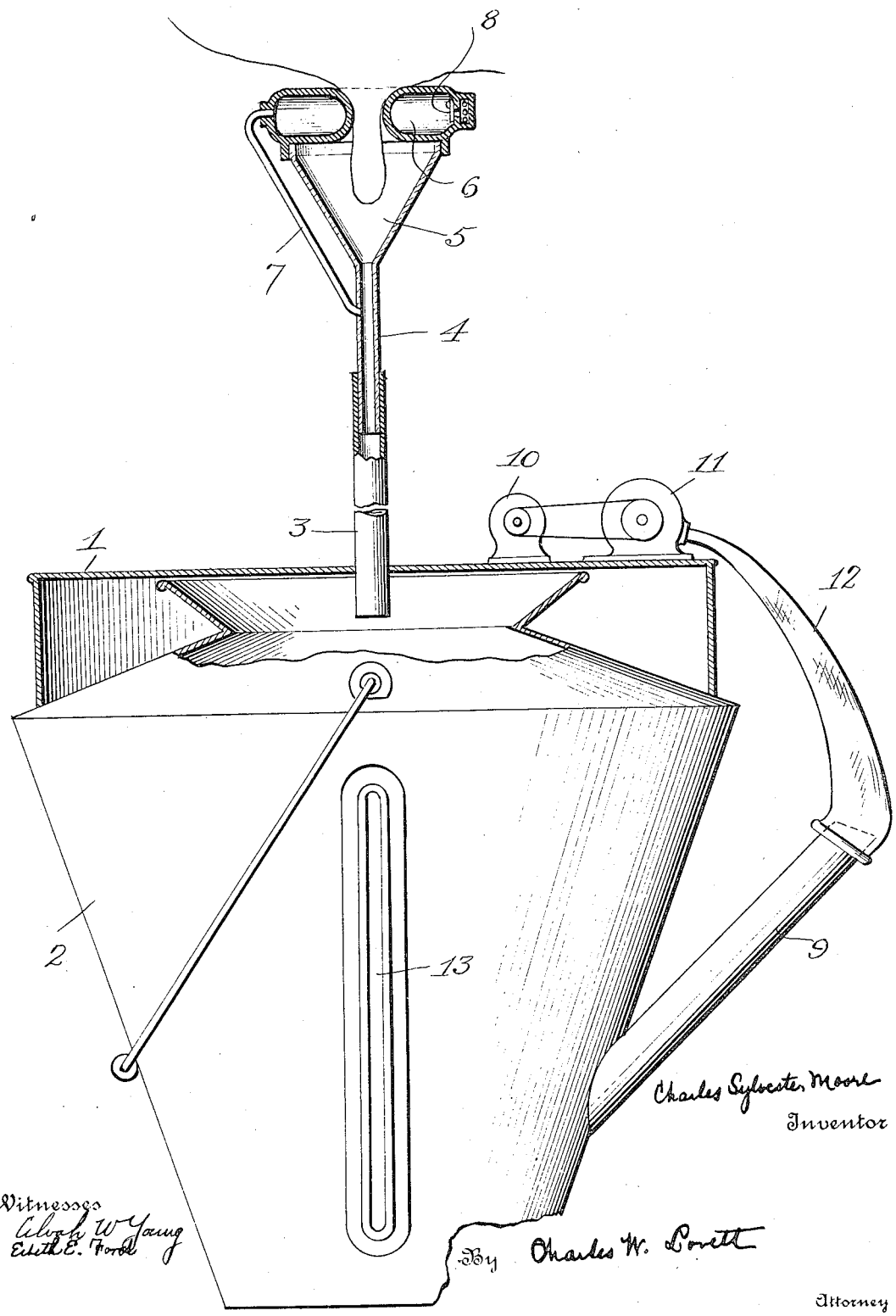

CHARLES SYLVESTER MOORE, OF DANVERS, MASSACHUSETTS.

MILKING-MACHINE.

1,148,706.

Specification of Letters Patent.    Patented Aug. 3, 1915.

Application filed October 15, 1914. Serial No. 866,779.

*To all whom it may concern:*

Be it known that I, CHARLES SYLVESTER MOORE, citizen of the United States, residing at 5 Oak street, Danvers, in the county of Essex and State of Massachusetts, have invented certain new and useful Improvements in Milking-Machines, of which the following is a specification.

This invention relates to improvements in sanitary milking machines, and is especially designed for use in connection with my improved sanitary milking pail on which patents have been granted, or it can be used together with other pails which can be covered to make air tight.

The important object of this invention, is to provide a means for extracting milk from the udder with as little human effort as possible by using mechanical means which will operate to closely resemble the motions of the human hand and thereby avoid contamination of the product by personal contact with the udder and teats and also prevent exposure of the product to the atmosphere.

Another object is to provide an efficient device at a minimum of expense and which is light in weight and portable so as to be easily and conveniently handled under any conditions where the ordinary milk pail might be used.

These and other objects are attained by the means illustrated in the accompanying, drawing in which is shown a milking pail in side elevation having a portion of its top broken away and my improved device shown in vertical section mounted thereon.

Referring to the drawing, the numeral 1 designates a detachable cover adapted to fit over and tightly close the mouth of the pail 2 to prevent the admission of the atmosphere and to form, together with the pail or milk receptacle, a chamber wherein a vacuum can be created. Connected in the top of this cover 1 is a main tube 3, preferably rubber, its lower end projecting through the cover and having connected in its other end the discharge tube 4 of a funnel-shaped receptacle 5, which is preferably constructed of rigid transparent material such as glass or the like.

Upon the top of the receptacle 5 is mounted a pneumatic ring 6 formed of flexible material which tightly closes the funnel around its edges, the central opening of the ring serving as a seat for the animal's teat. The air chamber of the ring 6 is connected by a tube 7 with the discharge tube of the receptacle 5, whereby a suction created in the milk pail will draw simultaneously through the funnel tube and connecting tube 7. The ring 6 is also provided at one side with an automatically operating vent valve 8, for a purpose hereinafter set forth. Vent-valve 8 can be constructed in any suitable manner, and in the present instance, it embodies an open pocket formed on the exterior of the ring and separated from the interior by an apertured diaphragm, said aperture being covered with a valve-flap which is adapted to open inwardly. It will be understood that the valve-flap is sufficiently rigid to resist the atmospheric pressure until an accumulated suction is had on the interior of the ring, so that, when a predetermined suction or vacuum is reached within the ring, the valve-flap will open and admit the atmospheric pressure. After the vacuum is broken, the inherent strength of the valve will automatically close it to allow another vacuum to form.

The pail used in the present embodiment is provided with a pouring spout 9, and as a part of my invention, the cover 1 has a mounted thereon a suitable motor 10, operatively connected to a suitable suction pump 11 mounted adjacent thereto, said pump being provided with or having connected thereto a flexible tubular connection 12 whose open or free end is adapted to fit upon, close and seal the mouth of the pouring spout 9. A glass covered sight-opening 13 is constructed in the side of the pail 2 through which the operator can discover the milk level.

In operation, the teat of the animal is inserted through the pneumatic ring, as shown in the drawing, and the motor is started to operate the pump which will cause a suction through the pail and the several connecting tubes. The suction produced in the funnel-shaped receptacle 5 has a tendency to draw the teat downward against the pressure of the ring 6, and as the tube 7 is relatively small, the air is very gradually exhausted from the interior of the ring allowing the same to collapse gradually and be drawn downwardly into the receptacle 5. This unequal sucking action in the receptacle 5 and interior of the ring, tends to produce a somewhat of a rolling action on the teat and adjacent portion of the udder until the suction within the ring is sufficient to automatically open the vent valve 8; this breaks the vacuum within the ring and allows the atmospheric pressure to again expand the ring to the normal position, after which the suction in the ring begins anew and the operation is repeated. The manipulation given the teat is somewhat of a double pulsation and closely resembles the motion of the human hand when milking. The continuous suction in the receptacle 5 constantly draws upon the teat pulling it downwardly against the gradually collapsing ring and is only overcome by the expanding of the ring which pulls the teat back again to its upward position. Thus the teat and the udder are constantly given a vertical reciprocating movement against a gradually collapsing pressure when moving downwardly and a quick pressure on its upward movement. It is of course understood, that the pulsations given the teat together with the suction produced, causes the milk to flow from the teat through the tubes 3 and 4 into the pail.

It will be understood, that I do not wish to be limited to the particular type of milk pail which is illustrated in the drawing wherein the spout is connected to the pail near its bottom, as it is preferable to use a pail having its spout connected to its top, whereby a greater quantity of liquid can be held therein before the milk will interfere with the suction through the spout.

Having thus fully described the invention, what is claimed is:—

1. In a milking machine, a pneumatic ring constructed to receive the teat of an animal, a receptacle supporting said ring, said ring being supported to bodily collapse downwardly in said receptacle to produce a rolling action on the teat, and means for creating a vacuum in said receptacle and ring.

2. In a milking machine, a pneumatic ring constructed to receive the teat of an animal, a receptacle supporting the outer edge of said ring whereby its inner portion can bodily collapse into said receptacle to produce a rolling action on the teat, and means for creating a vacuum in said receptacle and ring.

3. In a milking machine, a pneumatic ring constructed to receive the teat of an animal, a receptacle supporting said ring so that its inner portion can collapse downwardly in said receptacle to produce a rolling action on the teat, means for creating a vacuum in said receptacle, and a vent valve in said ring adapted to be opened by an accumulated suction in said ring.

4. In a milking machine, a pneumatic ring constructed to receive the teat of an animal, a receptacle supporting said ring so that its inner portion can collapse downwardly in said receptacle to produce a rolling action on the teat, means for creating unequal degrees of suction in said ring and receptacle and for gradually equalizing the suction to provide a gradual collapsing of the ring against a direct downward pull thereon, and means for automatically venting said ring.

5. In a milking machine, a detachable cover adapted for closing the mouth of a milk pail, a tube extending upwardly from said cover, a receptacle connected to the upper end of said tube, a pneumatic ring supported by said receptacle and adapted to collapse therein, and means for creating a vacuum in said receptacle and ring.

6. In a milking machine, the combination with a milk pail having an open mouth and a pouring spout, of a detachable cover for closing said mouth, a motor and exhaust pump mounted on said cover, a flexible tubular connection extending from said pump and adapted to fit on the mouth of said pouring spout, a receptacle connected to said cover, a pneumatic ring supported by said receptacle and adapted to collapse therein, and a vent valve in said ring.

7. In a milking machine, a detachable cover for closing the mouth of a milk pail, a main tube extending from said cover, a receptacle connected to the free end of said tube, a pneumatic ring supported by said receptacle and adapted to collapse therein, a relatively small tube connecting said main tube with the interior of said ring, and means for creating a vacuum in said pail and ring.

8. In a milking machine, a flat pneumatic ring provided with a central opening to receive the teat of an animal, a receptacle having a flaring mouth supporting said ring around its outer edge, whereby said ring can bodily collapse downwardly into said receptacle, and means for creating a vacuum in said receptacle and ring.

In testimony whereof I affix my signature in presence of two witnesses.

CHARLES SYLVESTER MOORE.

Witnesses:
 ARTHUR E. CARROLL,
 ALFRED W. BACON.